United States Patent [19]

Masukawa et al.

[11] Patent Number: 5,383,073
[45] Date of Patent: Jan. 17, 1995

[54] MAGNETIC HEAD SUPPORTING APPARATUS HAVING A FULCRUM POINT OF LOAD SUPPORT OFFSET FROM A SLIDER CENTER IN AN AIR UPSTREAM DIRECTION

[75] Inventors: Tetsuo Masukawa, Odawara; Masaaki Matsumoto, Higashiyamato; Yokuo Saitoh, Kanagawa; Yasuo Kojima, Odawara; Toshio Suzuki, Chigasaki; Yukimori Umakoshi; Kiyoji Morita, both of Odawara, Japan

[73] Assignee: Hitachi, Ltd., Tokyo, Japan

[21] Appl. No.: 916,699

[22] Filed: Jul. 22, 1992

[30] Foreign Application Priority Data

Jul. 23, 1991 [JP] Japan .................. 3-205609

[51] Int. Cl.$^6$ .................. G11B 5/596; G11B 5/60; G11B 21/20
[52] U.S. Cl. .................. 360/104; 360/103
[58] Field of Search .................. 360/103-106

[56] References Cited

U.S. PATENT DOCUMENTS

| | | | |
|---|---|---|---|
| 4,922,356 | 5/1990 | Yamaguchi et al. | 360/104 |
| 4,984,114 | 1/1991 | Takeuchi et al. | 360/103 |
| 5,012,369 | 4/1991 | Owe et al. | 360/104 |
| 5,079,660 | 1/1992 | Yumura et al. | 360/104 |
| 5,115,363 | 5/1992 | Khan et al. | 360/104 |
| 5,159,508 | 10/1992 | Grill et al. | 360/103 |
| 5,161,076 | 11/1992 | Inumochi et al. | 360/104 |

FOREIGN PATENT DOCUMENTS 57-569 1/1982 Japan .
58-22827 5/1983 Japan .

Primary Examiner—Stuart S. Levy
Assistant Examiner—Jefferson Evans
Attorney, Agent, or Firm—Antonelli, Terry, Stout & Kraus

[57] ABSTRACT

A magnetic head includes a gimbal with a head slider attached thereon, a load beam retained on the gimbal, and a mount attached on an end portion of the load beam on a side opposite to a side where the head slider is attached. A fulcrum portion as a center of load of the head slider is set on the gimbal to be shifted from a center of the head slider along its longitudinal direction to a proximal end side of the load beam, namely, toward an air upstream side. To compensate for the imbalance of the floating force due to the shift of the fulcrum portion, there is generated a moment about the fulcrum portion. The moment is provided by assigning an inclination angle to a slider attaching surface of the gimbal. The inclination angle can be adjusted by the height of the projection formed as the fulcrum portion. Moreover, the moment is generated by disposing rails on the head slider such that the width on the air upstream side of each rail is wider than the width on the air downstream side of the rail. This compensates for the variation in the load of the head slider and hence minimizes the change in the quantity of floating distance.

7 Claims, 2 Drawing Sheets

MAGNETIC HEAD SUPPORTING APPARATUS HAVING A FULCRUM POINT OF LOAD SUPPORT OFFSET FROM A SLIDER CENTER IN AN AIR UPSTREAM DIRECTION

BACKGROUND OF THE INVENTION

The present invention relates to a floating magnetic head for use with a magnetic disk unit, and particularly to, a floating magnetic head which minimizes a quantity of floating space between a magnetic disk and the magnetic head floating thereover and which is hence suitable for improving reliability of the magnetic disk unit.

There has been well known, in the field of magnetic information processing, a magnetic disk unit having a magnetic head which is set, in operation, to a floating state over a magnetic disk for recording and reproducing information thereon.

Ordinarily, the magnetic head of this kind includes a magnetic head slider having a magnetic transducer element (magnetic recording and reproducing element) and a magnetic head retainer spring which supports the slider. As a measure for increasing the recording density of the magnetic disk unit, it has been a common practice to minimize the floating space between the magnetic transducer element and the magnetic disk so as to reduce the so-called space loss. The space, namely, the quantity of floating distance of the magnetic head varies depending on fluctuations in the production precision and dynamic changes of the magnetic head during operations of the magnetic disk unit. Due to the variation in the quantity of floating distance, the head slider may possibly be brought into contact with the magnetic disk, moreover, under an undesirable condition, information written thereon may be destroyed. In consequence, there have been required a stably floating head slider in the floating state and a magnetic head retainer spring therefor.

There has been known a magnetic disk unit described, for example, in the JP-B-57-569. In the unit, in order to stabilize the quantity of floating distance of the magnetic transducer element formed in a magnetic head slider, there is arranged an information recording and reproducing gap in the magnetic transducer element on a rolling axis and a pitching axis of the magnetic head slider. In addition, there has been known a magnetic head device, for example, described in the JP-B-58-22827. The magnetic head includes a leaf spring (gimbal) for supporting a magnetic head slider. The spring includes two sided portions and a central portion to be folded such that the central portion is depressed downward to attach the slider on a lower surface of the central portion, and a projection equivalent to the quantity of the depression is disposed on an upper surface of the central portion, thereby preventing any yaw or fluctuation in the rolling and pitching actions.

In these magnetic head units, the fulcrum or supporting point of the load on the head slider determined according to a retaining arm or a load beam supporting the head slider is aligned at the center of the head slider along the direction from the front side of the head slider to the rear side thereof, namely, the direction of rotation of the magnetic disk or the direction of a flow of air generated by rotation of the disk.

FIG. 7 shows an example of a magnetic head in which the fulcrum portion is arranged at the central position of the head slider along the longitudinal direction thereof. The magnetic head includes a head retainer spring 1a including a load beam 1, a gimbal 2 and a mount 3, and a head slider 4. As shown in this diagram, a fulcrum portion 5 is aligned at the central portion (on the center of the length) of the head slider 4 along the longitudinal direction (from the front side to the rear side thereof).

SUMMARY OF THE INVENTION

In general, the quantity of the floating distance of the head slider changes according to fluctuations in the production precision of the head slider and the head retainer spring. Namely, there appear such fluctuations in the floating distance due to production precisions. Moreover, in operation of a magnetic disk unit, the head slider is subjected to various kinds of external force such as an external force associated with a seeking operation of the magnetic head and an external force caused by a flow of air generated between the magnetic head and the magnetic disk, which accordingly leads to a dynamic variation in the quantity of the floating distance of the head slider. As a result of the fluctuations associated with production precision and the dynamic variation above, the quantity of the floating distance may be unexpectedly decreased to bring the head slider into contact with the magnetic disk. In an undesirable situation, information stored in the magnetic disk may possibly be destroyed. Consequently, it is necessary to minimize the fluctuations respectively in the production precision and the dynamic variation in the quantity of floating distance. The requirements are particularly much more emphasized in association with the recent increase in the recording density of the magnetic disk unit and the decrease in the floating distance thereof.

However, according to research conducted by the present inventors, in the magnetic disk unit in which the fulcrum portion of the load thereof is arranged at a central portion of the head slider along the longitudinal direction thereof, it has been detected that the variation of the floating distance due to the fluctuations in the production precision and the dynamic variation in the floating distance cannot be easily reduced to a satisfactory extent.

It is therefore an object of the present invention to provide a magnetic head in which with respect to a fluctuation due to an external force of the head slider in a up-and-down or vertical direction and a pitching direction, a position of the magnetic transducer element formed in the head slider is not easily fluctuated.

According to an aspect of the embodiment of the present invention, the fulcrum portion of the head slider as a center of the load is shifted from the central portion of the slider along the longitudinal direction thereof to a proximal end side of a member retaining the slider along the longitudinal direction thereof, namely, toward an air upstream side. In order to correct at least a variation in the load on the head slider due to the shift of the fulcrum portion, there is developed a moment around the fulcrum portion of the head slider supported by the retaining member.

The moment generated about the fulcrum portion is provided by disposing the head slider on an attaching surface of the gimbal, the surface having a predetermined inclination.

To produce the gimbal, a flat plate is pressed, namely, there is obtained a punched portion for the attaching surface in the form similar to that of a horseshoe such that an end portion of the flat plate including portions of the punched section substantially parallel to each other is contracted so as to decide the angle of inclination of the attaching plate and to form a projection determining the fulcrum portion.

The moment generated about the fulcrum portion is provided by fabricating rails in a surface of the head slider opposing to the magnetic recording medium so as to arrange steps in the surface, the width on the air upstream side of each of the rails being larger than that on the air downstream side thereof.

According to the structure above, the fulcrum portion of the head slider is arranged on the side of the proximal end portion of the retaining member with respect to the center of the head slider along the pitching direction, namely, the longitudinal direction thereof. The fulcrum portion of the head slider is shifted from the center toward the air upstream side. Consequently, with respect to the variation in the position of the head slider due to an external force applied thereto in the vertical direction, the variation in the quantity of floating distance of the head slider on the air downstream side, namely, at a position where the magnetic transducer element is disposed, is minimized. In this case, the fulcrum portion of the head slider is aligned at a position shifted from the center of the head slider along the longitudinal direction thereof, the center being between the position and the proximal end portion of the retaining member. Consequently, the moment due to buoyancy on the air upstream side is greater than that caused by buoyancy on the air downstream side, which leads to imbalance in the distribution of load on the head slider between the front and rear ends (the air upstream and downstream sides) of the head slider along the longitudinal direction thereof. However, the imbalance above is corrected or compensated for by the preset moment. As a result, the shift of the fulcrum portion of the head slider does not deteriorate the stability of the floating distance with respect to the variation in the external force applied on the head slider along the longitudinal, namely, pitching direction. While sufficiently retaining the stability with respect to the external force in the pitching direction as above, it is also possible to further enhance the stability of the floating distance with respect to the external force applied thereto in the vertical direction.

In the structure for providing the moment, in a case where an inclined surface is adopted as the surface of the gimbal for attaching thereon the head slider, when the magnetic disk is rotated to generate a flow of air, the overall body of the head slider is lifted over the disk to a point where the predetermined quantity of floating distance is developed. In this situation, the posture of the head slider, namely, the state of the floating surface thereof with respect to the surface of the magnetic disk is set to a balanced state in which the portion of the head slider on the air upstream side is slightly higher than that of the head slider on the air downstream side. Consequently, the end portion of the gimbal on the air downstream side is bent upward in association with the angle of the inclined surface disposed on the attaching surface of the head slider so as to generate a spring force in the gimbal, thereby providing the moment for correction of the imbalance.

BRIEF DESCRIPTION OF THE DRAWINGS

These and other objects and advantages of the present invention will become apparent by reference to the following description and accompanying drawings wherein.

DESCRIPTION OF TEE PREFERRED EMBODIMENTS

Figure 1:
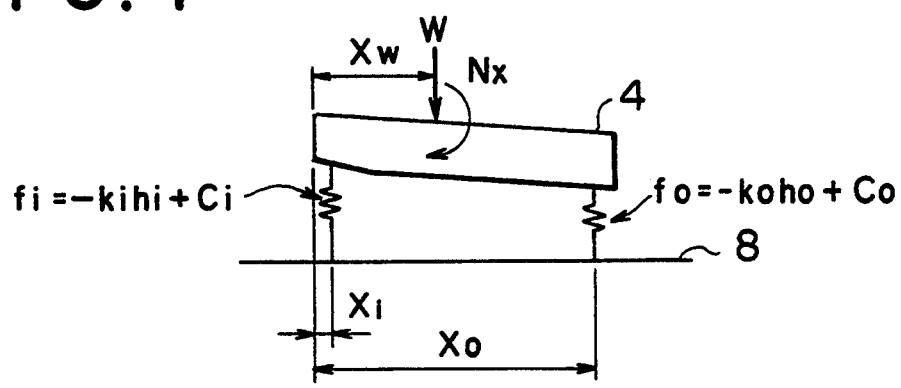
FIG. 1 is an explanatory diagram for explaining a model of the basic principle of a magnetic head according to the present invention.

Referring now to the drawings, description will be given of an embodiment according to the present invention.

First, the principle of operation of an embodiment according to the present invention will be described by reference to FIG. 1.

The structure of FIG. 1 includes a head slider 4 and a magnetic disk 8, wherein the left and right sides of this diagram respectively correspond to the upstream and downstream sides of a flow of air created when the magnetic disk is rotated. A magnetic transducer element (not shown) is formed on the head slider 4, for example, by a thin film technology such that transducing gaps thereof are developed in a bottom surface of the head slider 4, namely, in a surface of rails where steps are formed.

Between the head slider 4 and the magnetic disk 8, there is formed a layer of air which sets the head slider 4 in the floating state. In this example, the layer of air is assumed to be a linear spring. The spring action of the layer of air is applied onto the head slider 4 along the longitudinal direction thereof. For simplification of explanation, however, the spring action is shown in this diagram to be concentrated onto the proximity of the air upstream end and that of the air downstream end. Assuming that f, h, k (k>0), and c (c>0) respectively represent a floating force or buoyancy, a quantity of floating distance, a spring constant, and a constant, there is attained a relationship as follows;

$$f = -kh+ \qquad (1)$$

Moreover, assuming that w indicates a load on the head slider and NX denotes an angular moment in the pitching direction with respect to the fulcrum portion. Furthermore, the floating force $f_i$ caused by the spring action on the head slider 4 on the air upstream side and the floating $f_o$ caused by the spring action on the head slider 4 on the air downstream side are represented by the following expressions (2) and (3);

$$f_o = -k_o h_o + c_o \quad (2)$$

$$f_i = -k_i h_i + c_i \quad (3)$$

In addition, assuming that $X_i$ designates the distance from an end of the head slider 4 on the air upstream side to the point of application of the spring on the air upstream side, $X_o$ stands for the distance from an end of the head slider 4 on the air upstream side to the point of application of the spring on the air downstream side, and $X_w$ indicates the distance from an end of the head slider 4 on the air upstream side to the fulcrum portion, there are obtained expressions (4) and (5) as follows;

$$w = f_i + f_o \quad (4)$$

$$N_x + f_i(X_w - X_i) = f_o(X_o - X_w) \quad (5)$$

In these expressions, for stabilizing the head slider 4, it is necessary to control the quantity of the floating distance $h_o$ of the head slider 4 on the air downstream side where the magnetic transducer element is disposed. According to the expressions, the quantity of the floating distance $h_o$ of the head slider 4 on the air downstream side is represented as follows;

$$h_o = -[w(X_w - X_i) + N_x]/[k_o(X_o - X_i)] + c_o/k_o \quad (6)$$

Based on the expression (6), a rate of variation in the quantity of the floating distance $h_o$ with respect to the load thereon is expressed as follows;

$$\delta h_o/\delta w = -[X_w - X_i]/[k_o(X_o - X_i)] \quad (7)$$

Moreover, a rate of variation thereof with respect to the pitching moment is represented as follows;

$$\delta h_o/\delta N_x = -1/[k_o(X_o - X_i)] \quad (8)$$

These ratios are efficiently minimized through the following steps.
 (a) Increase the hardness $k_o$ of layer of air on the air downstream side.
 (b) Decreases the value of fulcrum position $X_w - X_i$, namely, shift the fulcrum toward air upstream side.
 (c) Increase the distance $X_o - X_i$ between the front and rear ends of the spring developed by the layer of air.

In this connection, the position of fulcrum portion indicates a center of the load on the head slider 4 when the head slider 4 is combined with the member retaining the head slider.

The position of fulcrum portion is shifted from the center of head slider 4 toward the air upstream side, $$X_w \to nX_w (0 < n < 1),$$

namely, the position is moved from the center of the head slider 4 along the longitudinal direction toward the air upstream side. This leads to a variation in the distribution of load on the head slider 4 between the air upstream and downstream sides. The variation is compensated for by the initial moment $N_x$. In other words, when the position of fulcrum portion is moved from the center of head slider 4 toward the air upstream side, the counterclockwise angular moment due to the floating force $f_o$ on the air downstream side becomes to be greater than the clockwise angular moment due to the floating force $f_i$ on the air upstream side. The resultant difference generates an angular moment in a direction opposite to that of the moment $N_x$ shown in FIG. 1. In order to cancel or compensate for the differential moment, there is produced the initial moment ($N_x$ of FIG. 1). As a result, when there exists the initial angular moment $N_x$ at the position of fulcrum portion $nX_w$, the floating force $f_o$ on the air downstream side is expressed as follows;

$$f_o = [w(nX_w - X_i) + N_x]/[X_o - X_i] \quad (9)$$

In contrast thereto, when there is missing the initial angular moment $N_x$ at the position of fulcrum $X_w$, the floating force $f_o$ on the air outlet side is expressed as follows;

$$f_o = [w(X_w - X_i)/[X_o - X_i] \quad (10)$$

From the expressions (9) and (10), the following initial moment $N_x$ is attained;

$$N_x = (1-n)wX_w \quad (11)$$

In this situation, a rate of improvement of the rate of variation with respect to the load is obtained as follows from the expressions (7) or (2), (9), and (10);

$$\begin{aligned}\alpha &= [\delta h_o/\delta w \text{ for } X_w = nX_w]/[\delta h_o/\delta w \text{ for } X_w = X_w] \\ &= [nX_w - X_i]/[X_w - X_i]\end{aligned} \quad (12)$$

Assuming $X_i < X_w$ in the expression (12), the rate of improvement is expressed as follows;

$$\alpha = n \quad (13)$$

The expression (12) indicates that the smaller the value of n is, the smaller is the value of $\alpha$. That is, the change in the quantity of floating distance with respect to the variation in the load is minimized, which leads to a satisfactory stability of the head slider 4.

In consequence, the variation in the quantity of floating distance with respect to the vertical variation due to the load can be reduced in association with the rate n resultant from the shift of the fulcrum portion toward the air upstream side. Moreover, the variation in the quantity of floating distance with respect to the variation in the pitching moment is not deteriorated.

As described above, the position of the fulcrum portion on the head slider 4 is aligned to a position shifted from the center of the head slider 4 toward the air upstream side and the initial moment $N_x$ is applied to the head slider 4 at the position of the fulcrum portion. With this provision, for the variation in the position of the head slider 4 due to an external force vertically applied thereto and the variation thereof due to an external force in the pitching direction, it is possible to minimize the quantity of the variation in the floating distance of the position of the magnetic transducer element fabricated on the head slider 4. Setting the floating force $f_o$ on the head slider 4 on the air downstream side, the weight w of the head slider 4, and the initial moment $N_x$ respectively to appropriate values in advance, the position of the fulcrum portion can be easily determined through a simulation process according to the known technology.

Figure 2:
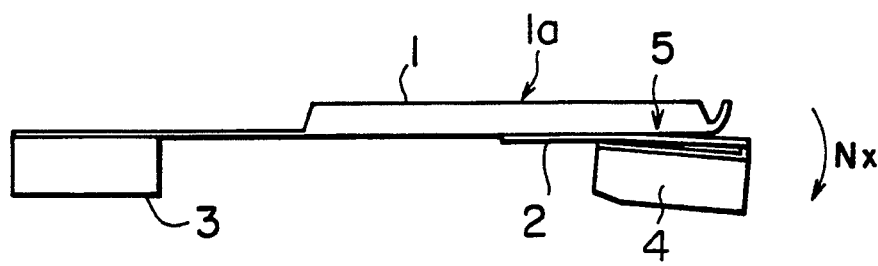
FIG. 2 is a side view showing the structure of a magnetic head in a first embodiment according to the present invention.

Referring next to FIG. 2, description will be given of an embodiment implemented according to the principle of the present invention.

Figure 3A:
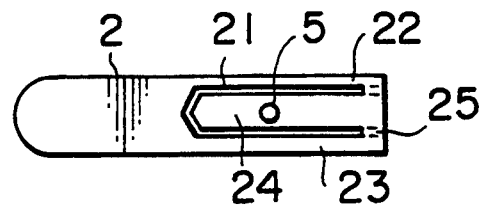
FIG. 3A is a plan view showing the structure of a gimbal.
Figure 3B:
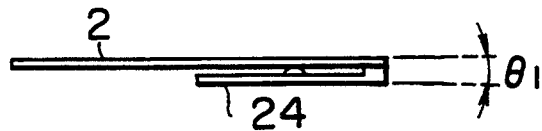
FIG. 3B is a side view showing an example of the gimbal.
Figure 3C:
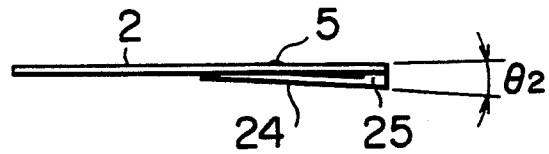
FIG. 3C is a side view showing the configuration of the gimbal of FIG. 3A.

FIG. 2 is a side view showing a magnetic head in a first embodiment configured in accordance with the principle of the present invention. FIGS. 3A, 3B, and 3C show constructions of a gimbal employed in the magnetic head of FIG. 2 in comparison with a conventional example. The magnetic head includes a head retainer spring 1a constructed with a load beam 1, a gimbal (leaf spring) 2 and a weight 3, and a head slider 4. A reference numeral 5 denotes a fulcrum portion of load, which is indicated by a projection disposed in the gimbal 2 arranged on the load beam 1. The projection is used as an indication or guide mark when the head slider 4 and the gimbal 2 are assembled and when the head slider 4 and the load beam 1 are assembled.

Figure 7:
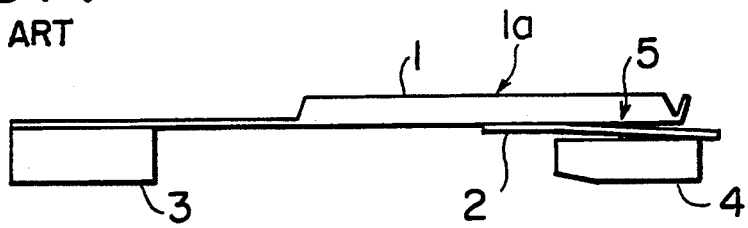
FIG. 7 is a side view showing a conventional example of the magnetic head.

As already described in conjunction with FIG. 7, in the magnetic head, the point of fulcrum portion 5 is set to a central portion (in the length) of the head slider 4 along the longitudinal direction thereof (in the direction from the front side to the rear side or in the direction of the flow of air). In addition, there is not particularly added any initial angular moment.

In contrast thereto, according to the first embodiment shown in FIG. 2, the position of fulcrum portion 5 is aligned at a position shifted from the center of the head slider 4 along the longitudinal direction thereof to the proximal end side of the load beam 1, namely, toward the air upstream side. Moreover, the initial moment $N_x$ is applied to the head slider 4. Furthermore, on a floating surface of the head slider 4, there are formed of two rails to form thereon two steps each having a fixed distance therebetween along the direction of the flow of air.

To provide the initial moment $N_x$, according to this embodiment, an initial angle is set to a slider attaching surface of the gimbal 2 along the pitching direction of the head slider 4. The structure is obtained as follows. A forming angle is set to the slider attaching surface in the press work of the gimbal 2. FIGS. 3A and 3C show constructions of the gimbal 2. The gimbal 2 has a slider attaching surface 24 formed by a notching work. Moreover, an end portion of the gimbal 2 including parallel portions of a slot 21 notched in the shape of a horseshoe is contracted such that there is provided a forming angle $\theta_2$ as an inclination angle with respect to the slider attaching surface 24 as shown in FIG. 3C. The gimbal 2 includes side portions 22 and 23 separated by the slot 21 extending in the longitudinal direction and the slider attaching surface 24. The slider attaching surface 24 is folded at a step 25 formed by the contraction work of an end portion to be coupled with the side end portions 22 and 23. The position of the fulcrum portion 5 is disposed in the slider attaching surface 24. The fulcrum portion 5 is also produced in the form of a projection through the contraction work. The height of the projection is adjustable in the work. The head slider 4 is attached onto the slider attaching surface 24. FIG. 3B shows an example of a disadvantageous arrangement of an angle for a gimbal 2. The forming angle $\theta_1$ of the gimbal 2 is provided in the press work such that in an actual operation after the gimbal 2 is assembled in the head retainer spring 1a, the fulcrum portion 5 is brought so as to set the slider attaching surface 24 to be parallel to the magnetic disk. In contrast thereto, according to the embodiment, the forming angle of the gimbal 2 is set to $\theta_2$ ($\theta_2 > \theta_1$) as shown in FIG. 3C, thereby applying the initial moment $N_x$ to the head slider 4. FIGS. 3B and 3C show states of the gimbal 2 free from an external force. The bottom (floating) surface of the head slider 4 attached onto the slider attaching surface 24 of the gimbal 2 is parallel to the slider attaching surface 24. In other words, the bottom surface of the head slider 4 is arranged to be slightly lifted on the air upstream side of the head slider 4 with respect to the surface of the magnetic disk 8. In this connection, in FIGS. 2 and 7, the gimbal 2 with the head slider 4 attached thereon is mounted on the load beam 1 at a position of the gimbal 2 in the vicinity of the left end thereof. The right-hand side of the gimbal 2 is slightly lower in comparison with the left-hand side thereof with respect to the load beam 1. This is because the fulcrum portion 5 is brought into contact with the load beam 1 to push the gimbal 2 downward. When the gimbal 2 is thus depressed downward and is accordingly bent, the end portion of the slider attaching surface 24 on the air upstream side is slightly apart from the upper portion of the gimbal 2. The magnitude of separation or the distance therebetween is determined by the height of the projection disposed in the fulcrum portion 5. Namely, the forming angle $\theta_2$ can be adjusted by the height of the projection.

Assuming that this embodiment is operated according to, for example, a contact start and stop (CSS) method. When the magnetic disk 8 is initially in the stationary state, the overall floating surface of the head slider 4 is in contact with the surface of the magnetic disk 8. When the magnetic disk 8 is started and the rotary speed thereof reaches a predetermined value to generate a flow of air, the entire body of the head slider 4 is lifted therefrom until the quantity of floating distance or floating quantity is equal to a predetermined value. In this state, the head slider 4 is set to a posture (a state of the floating surface) in which the portion of the head slider 4 on the air upstream side is slightly higher than the portion thereof on the air downstream side. Consequently, in the construction of this embodiment, there appears a force to bend upward the side edges respectively of the end portions 22 and 23 in association with a differential angle between the forming angle $\theta_2$ and the forming angle $\theta_1$ shown in FIG. 3B. However, there arises a spring force of the gimbal 2 sustaining the side edges against the bending force, thereby correcting the variation due to the bending force as shown in FIG. 1.

Figure 4:
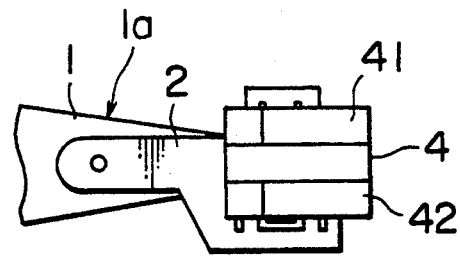
FIG. 4 is a bottom view showing a magnetic head in a second embodiment according to the present invention.
Figure 5A:
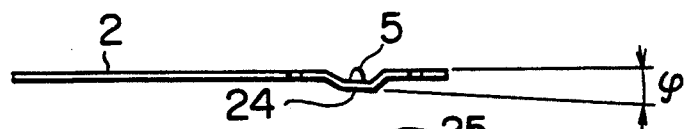
FIG. 5A is a side view showing a gimbal used in the magnetic head of FIG. 1.
Figure 5B:
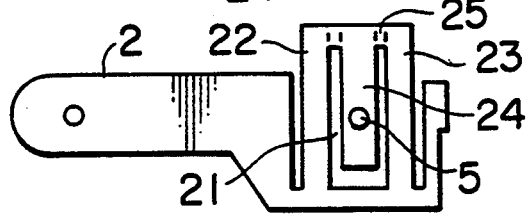
FIG. 5B is a plan view showing the gimbal of FIG. 5A.

Next, FIGS. 4, 5A, and 5B show a magnetic head in a second embodiment according to the present invention. Specifically, FIG. 4 is a bottom view showing the construction of the primary portion of the magnetic head viewed from the bottom surface, whereas FIGS. 5A and 5B respectively are the side and plan views of the gimbal 2. In these diagrams, the same elements as those of FIGS. 2, 3A, 3B, and 3C are assigned with the same reference numerals. In this regard, reference numerals 41 and 42 denote rails fabricated on a floating surface of the slider 4 to form steps thereon. The magnetic transducer element is formed at an end portions of the rails 41 and 42 on the air downstream side according to, for example, a thin film technology, thereby constructing a magnetic head of an in-line type. In this embodiment, a slot 21 is manufactured to be orthogonal to the longitudinal direction of the gimbal 2 (the direction of the flow of air). A fulcrum portion 5 is shifted from the center of the head slider 4 along the longitudinal direction thereof toward the air upstream side to be set to a position which is the center of load of the head slider 4. According to this embodiment, the initial moment $N_x$ is attained by assigning a gimbal angle $\psi$ to the gimbal 2 through the press work thereof as shown in FIG. 5A. The head slider 4 is attached onto a head slider surface 24 having the gimbal angle $\psi$. The operation of the head slider 4 with respect to the magnetic disk 8 is substantially identical to that described in conjunction with the first embodiment.

Figure 6:
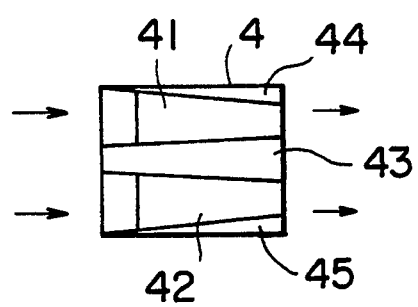
FIG. 6 is a bottom view showing an example of rails disposed on a magnetic head slider.

Subsequently, FIG. 6 shows another example of the construction of rails 41 and 42. In this diagram, reference numerals 43, 44, and 45 denote depressions manufactured in the head slider 4. According to this embodiment, in place of altering the forming angle of the gimbal 2 to provide the initial moment $N_x$ as above, the head slider 4 is constructed such that the rail width of each of the rails 41 and 42 on the air upstream side is larger than the rail width thereof on the air downstream side as shown in FIG. 6 so as to provide the moment in the pitching direction of the head slider 4. In this head slider 4, as compared with the head slider 4 having a uniform rail width, the floating force due to the wider portion of the rail is greater than that developed by the narrower portion thereof. This resultantly increases the moment associated with the layer of air in the pitching direction and hence leads to an effect equivalent to that of the initial moment provided by changing the forming angle of the gimbal 2. In this embodiment, like in the other embodiments, the position of fulcrum portion 5 is similarly shifted from the center of the head slider 4 along the longitudinal direction thereof such that the fulcrum portion 5 is set to the center of load of the head slider 4.

Theoretically, the variation in the floating distance can be further minimized by increasing the quantity of shift of the position of fulcrum portion 5 from the center of the head slider 4 along the longitudinal direction thereof. However, when the quantity of shift is excessively increased, the head slider 4 may be set to an unstable state; consequently, the quantity of shift is limited to an appropriate value.

In the description of embodiments above, although the magnetic transducer element is arranged on the end surface of the head slider 4 on the air downstream side, the present invention is not restricted by the embodiments and can be similarly applied, for example, to a head slider such as a crown-type head slider in which the magnetic transducer element is arranged on the end surface of the head slider 4 on the air upstream side. In either case, it is only necessary to reduce the variation in the quantity of floating distance at a point where the magnetic transducer element is disposed, namely, the rate of variation thereof need only be decreased with respect to the variation in the load and the variation in the pitching action.

According to the embodiments above, in a simple configuration in which the position of fulcrum portion 5 is moved and the gimbal 2 is provided with a forming angle or the width of each of the rails 41 and 42 of the head slider 4 need only be changed along the longitudinal direction thereof, it is possible to reduce the variation in the quantity of floating distance with respect to the change in the load of the head slider 4 at a position of the magnetic transducer element, thereby stabilizing the variation in the quantity of floating distance. Resultantly, the rated quantity of floating distance of the head slider 4 can be minimized in a designing process thereof; accordingly, a higher recording density can be developed in the magnetic disk unit.

As described in detail above, the position of fulcrum portion 5 of the head slider 4 is shifted from the center of the head slider 4 along the longitudinal direction thereof such that the fulcrum portion 5 is set to the center of load of the head slider 4. Consequently, as compared with a magnetic head in which the position of fulcrum portion 5 is set to the center of length of the head slider 4 along its longitudinal direction, the variation in the floating distance of the portion of the magnetic transducer elements formed on the head slider 4 is minimized with respect to the change in the strength of external force vertically applied to the head slider 4.

Moreover, since an angular moment is applied about the fulcrum portion 5 to correct the variation in the distribution of load due to the shift of the position of fulcrum portion 5, the stability of action of the head slider 4 is kept unchanged with respect to the variation in the strength of external force in the pitching direction.

While particular embodiments of the invention have been shown and described, it will be obvious to those skilled in the art that various changes and modifications may be made without departing from the present invention in its broader aspects.

We claim:

1. A magnetic head including a head slider having a magnetic transducer element and opposed to a surface of a magnetic recording medium and a retainer member for retaining thereon at least said head slider, thereby said head slider being lifted above said surface of said magnetic recording medium by an air flow generated in accordance with a rotation of said magnetic recording medium, achieving read and write operations of information on said magnetic recording medium, said head comprising: a fulcrum point of load support of said head slider is displaced from a center of said head slider with respect to a longitudinal length thereof toward an air upstream side; and a static moment means is provided to generate a static moment about said fulcrum point of said head slider, wherein during an operation of said magnetic head in said air flow of said magnetic recording medium, a downstream moment imparted to an air downstream side of said head slider by said air flow is greater than an upstream moment imparted to said air upstream side of said head slider by said air flow, and wherein an excess of said downstream moment over said upstream moment is an opposing and offsetting relationship with said static moment such that an angular variation of a surface of said head slider with respect to said surface of said magnetic recording medium is compensated, said angular variation being caused by a position of said fulcrum point.

2. A magnetic head according to claim 1, wherein said static moment means for generating said static moment about said fulcrum point of said head slider is implemented by attaching said head slider on an attaching surface of a gimbal, said attaching surface having an inclined surface.

3. A magnetic head according to claim 2, wherein:
said gimbal is manufactured by a press work of a flat plate; said attaching surface is formed by punching a punched portion in said flat plate in a form of substantially a horseshoe; an end portion of said flat plate including substantially parallel portions of said punched portion is contracted to determine an inclination angle of said attaching surface; and said attaching surface is subjected to a contraction work to form said fulcrum point.

4. A magnetic head according to claim 3, wherein a position of said fulcrum point is obtained through a simulation processing based on at least: a weight W determined by at least a weight of said head slider, said gimbal and said retainer member; a moment $N_x$ generated about said fulcrum point; and a floating force $F_0$ applied onto a downstream surface of an end portion of said head slider extending from said retainer member, said downstream surface opposing said magnetic recording medium.

5. A magnetic head according to claim 3, wherein said fulcrum point is formed with a projection having a height with respect to a surface of said gimbal, said height being adjustable in said press work.

6. A magnetic head according to claim 1, wherein said static moment means for generating said static moment about said fulcrum point of said head slider is implemented by arranging rails on a surface of said head slider, and a width on an air upstream side of each of said rails being wider than a width on an air downstream side thereof.

7. A magnetic head including a head slider having a magnetic transducer element and opposed to a surface of a magnetic recording medium and a retainer member for retaining thereon at least said head slider, thereby said head slider being lifted above said surface of said magnetic recording medium by an air flow being generated in accordance with a rotation of said magnetic recording medium to pass from substantially a proximal end side of said retainer member along said surface of said magnetic recording medium, thereby achieving read and write operations of information on said magnetic recording medium: wherein a fulcrum point of load support of said head slider is displaced from a center of said head slider with respect to a longitudinal length thereof to said proximal end side of said retainer member; and wherein a static moment means is provided to generate, in response to said air flow, a static moment about said fulcrum point of said head slider, wherein during an operation of said magnetic head in said air flow of said magnetic recording medium, a distal moment imparted to a distal end side of said head slider by said air flow is greater than a proximal moment imparted to said proximal end side of said head slider by said airflow, and wherein an excess of said distal moment over said proximal moment is in an opposing and offsetting relationship with said static moment such that an angular variation of a surface of said head slider with respect to said surface of said magnetic recording medium is compensated, said angular variation being caused by a position of said fulcrum point.

* * * * *